(12) United States Patent
Kawai et al.

(10) Patent No.: US 11,353,144 B2
(45) Date of Patent: Jun. 7, 2022

(54) THREADED JOINT

(71) Applicant: JFE STEEL CORPORATION, Tokyo (JP)

(72) Inventors: Takamasa Kawai, Tokyo (JP); Taro Kanayama, Tokyo (JP); Masaki Yoshikawa, Tokyo (JP); Tsuyoshi Yoneyama, Tokyo (JP); Seigo Goto, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 17/283,018

(22) PCT Filed: Jun. 13, 2019

(86) PCT No.: PCT/JP2019/023549
§ 371 (c)(1),
(2) Date: Apr. 6, 2021

(87) PCT Pub. No.: WO2020/075342
PCT Pub. Date: Apr. 16, 2020

(65) Prior Publication Data
US 2021/0341084 A1    Nov. 4, 2021

(30) Foreign Application Priority Data
Oct. 10, 2018 (JP) .............................. JP2018-192088

(51) Int. Cl.
*F16L 15/00* (2006.01)
(52) U.S. Cl.
CPC ................................. *F16L 15/007* (2013.01)
(58) Field of Classification Search
CPC .... F16L 15/007; F16L 15/002; E21B 17/0423
See application file for complete search history.

(56) References Cited

U.S. PATENT DOCUMENTS

| 4,346,920 A | 8/1982 | Dailey |
| 10,145,495 B2 | 12/2018 | Elder et al. |

(Continued)

FOREIGN PATENT DOCUMENTS

| JP | 5232475 B2 | 7/2013 |
| JP | 2013536339 A | 9/2013 |
| WO | 2016157887 A1 | 10/2016 |

OTHER PUBLICATIONS

Aug. 6, 2019, International Search Report issued in the International Patent Application No. PCT/JP2019/023549.

(Continued)

*Primary Examiner* — David Bochna
(74) *Attorney, Agent, or Firm* — Kenja IP Law PC

(57) ABSTRACT

A threaded joint with excellent tensile strength, comprising: a pin having an externally threaded part comprising a first and second externally threaded sections across a step on an outer periphery on a distal-end side of a first steel pipe or tube; and a box having an internally threaded part comprising a first and second internally threaded sections across the step on an inner periphery on a distal-end side of a second steel pipe or tube, the externally threaded part being screwed to the internally threaded part to join the pin and the box. The threaded joint has a first and second thread sequence with lengths L1 and L2, respectively, and cross-sectional areas P1, P2, B1, and B2 at end positions 4, 5, 6, and 7, respectively, satisfying Formulas (1) and (2): $(P2, B2)_{min} \leq P1/\{L1/(L1+L2)\}$ (1) and $(P2, B2)_{min} \leq B1/\{L2/(L1+L2)\}$ (2), where $(P2, B2)_{min}$ represents P2 or B2, whichever is smaller.

3 Claims, 1 Drawing Sheet

(56) References Cited

U.S. PATENT DOCUMENTS

2008/0265569 A1  10/2008  Carcagno et al.
2018/0080287 A1   3/2018  Yoshikawa et al.
2020/0278057 A1*  9/2020  Inose .................. E21B 17/0423
2021/0254414 A1*  8/2021  Briane ................ E21B 17/0423
2022/0010894 A1*  1/2022  Inose .................... F16L 15/002

OTHER PUBLICATIONS

Oct. 6, 2020, Notification of Reasons for Refusal issued by the Japan Patent Office in the corresponding Japanese Patent Application No. 2019-550270 with English language Concise Statement of Relevance.

Mar. 18, 2022, Office Action issued by the IP Australia in the corresponding Australian Patent Application No. 2019356283.

\* cited by examiner

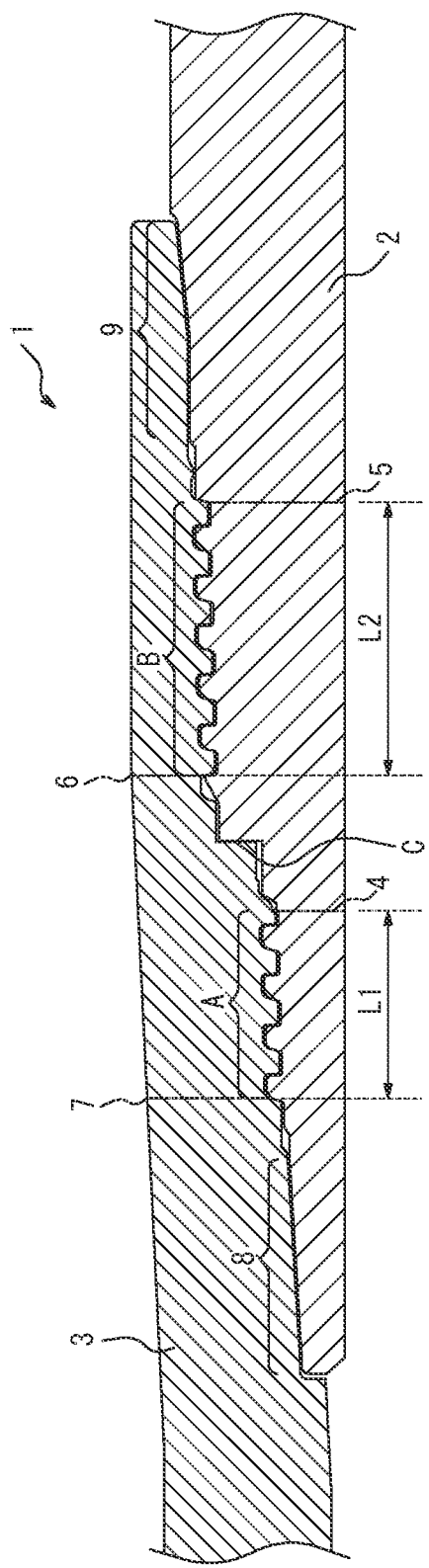

THREADED JOINT

TECHNICAL FIELD

This disclosure relates to a threaded joint used for oil well pipes or tubes encompassing tubing and casings typically used in exploration of oil wells or gas wells and in production. Specifically, this disclosure relates to a threaded joint used to connect steel pipes or tubes such as OCTG (Oil Country Tubular Goods), riser pipes, and line pipes.

BACKGROUND

Threaded joints are widely used for connecting steel pipes or tubes for use in facilities of oil-producing industries such as oil well pipes or tubes. To connect steel pipes or tubes for use in exploration or production of oil and gas, conventionally, standard threaded joints based on the API (American Petroleum Institute) standard have been typically used.

In recent years, crude oil wells and natural gas wells are becoming deeper and the number of horizontal wells and directional wells is increasing relative to the number of vertical wells. Thus, the drilling or production environment is becoming increasingly severe. Further, development of wells in adverse environments such as oceans or polar regions is increasing, and thus various performance such as compression resistance, bending resistance, sealability against external pressure are required for threaded joints. Because of such required performance, in recent years, high-performance threaded joints, which are called premium joints, are being increasingly used. Further, to reduce the excavation amount in developing wells, the size of the wells is required to be reduced. To address to these issues, among the premium joints, demand for an integral-type threaded joints which directly connects steel pipes or tubes with each other without any coupling member interposed therebetween (hereinafter, also referred to as "integral joint") is increasing.

The integral joint comprises a pin having external threads provided at an end of one steel pipe or tube and a box having internal threads provided at an end of the other steel pipe or tube. Further, the integral joint includes a joint in which thread sequence formed by screwing external threads and internal threads with each other are divided into two parts by a step (shoulder). The step serves as an abutment when the joint is fastened.

FIG. 1 of JP 5232475 B (PTL 1) illustrates an integral joint having a step. PTL 1 has an aim of producing a threaded joint provided with an improved seal which maintains a proper rigidity. Further, in PTL 1, a threaded joint having steps is provided with a reinforcement section protruding to the most distal end of a box. The length and the thickness of this reinforcement section are defined, and the whole length of the reinforcement section is prevented from coming into contact with an opposite base pipe or tube on the proximal-end side of a pin.

CITATION LIST

Patent Literature

PTL 1: JP 5232475 B

SUMMARY

Technical Problem

It has become clear that the threaded joint of PTL 1 can maintain a proper rigidity in virtue of the reinforcing section, but the threaded joint has room for improvement regarding tensile strength.

It could thus be helpful to provide a threaded joint having excellent tensile strength.

Solution to Problem

Conventionally, it has been identified that in a threaded joint having a step (shoulder), when a tensile load is applied to the axial direction of a steel pipe or tube, the threaded joint is preferentially fractured in an end position having a smaller cross-sectional area on the proximal-end sides of external and internal threads. However, we found that when a fracture test which applies a predetermined load to a threaded joint is performed, a threaded joint can be fractured in the vicinity of the shoulder at which the threaded joint has been conventionally identified not to be fractured.

The disclosure is based on the findings described above and has the following primary features.

[1] A threaded joint comprising:

a pin having an externally threaded part comprising a first externally threaded section and a second externally threaded section across a step on an outer periphery on a distal-end side of a first steel pipe or tube; and a box having an internally threaded part comprising a first internally threaded section and a second internally threaded section across the step on an inner periphery on a distal-end side of a second steel pipe or tube, the externally threaded part being screwed to the internally threaded part to join the pin and the box, wherein the first externally threaded section is provided on the distal-end side of the first steel pipe or tube with respect to the second externally threaded section, the first internally threaded section is provided on the distal-end side of the second steel pipe or tube with respect to the second internally threaded section, and assuming:

a region in which the first externally threaded section is screwed to the second internally threaded section is defined as a first thread sequence, a region in which the second externally threaded section is screwed to the first internally threaded section is defined as a second thread sequence;

a length of the first thread sequence in the axial direction of the steel pipe or tube is defined as L1, and a length of the second thread sequence in the axial direction of the steel pipe or tube is defined as L2;

in the pin, a cross-sectional area in the radial direction at an end position on the opposite side to a distal end of the pin in the first thread sequence is defined as P1, and a cross-sectional area in the radial direction at an end position on the opposite side to a distal end of the pin in the second thread sequence is defined as P2; and in the box, a cross-sectional area in the radial direction at an end position on the opposite side to a distal end of the box in the second thread sequence is defined as B1, and a cross-sectional area in the radial direction at an end position on the opposite side to a distal end of the box in the first thread sequence is defined as B2, then L1, L2, P1, P2, B1, and B2 satisfying the following Formula (1) and Formula (2):

$$(P2, B2)_{min} \leq P1/\{L1/(L1+L2)\} \quad (1)$$

$$(P2, B2)_{min} \leq B1/\{L2/(L1+L2)\} \quad (2)$$

where $(P2, B2)_{min}$ represents P2 or B2, whichever is smaller.

[2] The threaded joint according to [1], wherein the pin and the box have a radial seal structure in which the pin and the box are in metal contact with each other in the radial direction of the steel pipe or tube to thereby seal fluid.

[3] The threaded joint according to [1] or [2], wherein the externally threaded part and the internally threaded part are tapered.

Advantageous Effect

According to this disclosure, it is possible to obtain a threaded joint having excellent tensile strength.

BRIEF DESCRIPTION OF THE DRAWING

In the accompanying drawing:
FIG. 1 illustrates a sectional view of a threaded joint 1 according to one of the embodiments of the disclosure.

DETAILED DESCRIPTION

One of the embodiments of the disclosure will be explained below with reference to the drawing.

FIG. 1 illustrates a state of two steel pipes or tubes being connected with each other. A threaded joint 1 in this embodiment is an integral-type threaded joint (hereinafter, referred to as "integral joint") comprising a pin 2 and box 3, the pin 2 having an externally threaded part comprising a first externally threaded section and a second externally threaded section on an outer periphery on a distal-end side of a first steel pipe or tube across a step C, the box 3 having an internally threaded part comprising a first internally threaded section and a second internally threaded section on an inner periphery on a distal-end side of a second steel pipe or tube across the step C, the externally threaded part being screwed to the internally threaded part to directly join the pin and the box. The first externally threaded section is provided on the distal-end side of the first steel pipe or tube with respect to the second externally threaded section. The first internally threaded section is provided on the distal-end side of the second steel pipe or tube with respect to the second internally threaded section. As used herein, a region in which the first externally threaded section is screwed to the second internally threaded section is referred to as a first thread sequence A. A region in which the second externally threaded section is screwed to the first internally threaded section is referred to as a second thread sequence B. In a cross section perpendicular to the axial direction of the steel pipe or tube, the first thread sequence A is positioned on the inner diameter side of the steel pipe or tube, and the second thread sequence B is positioned on the outer diameter side of the steel pipe or tube.

The step C is formed by a shoulder surface on the pin-2 side and a shoulder surface on the box-3 side, and serves as an abutment in fastening the threaded joint 1. A cross-sectional area of the shoulder surface on the pin-2 side and a cross-sectional area of the shoulder surface on the box-3 side which form the step C are each preferably 15% or more and 35% or less of the cross-sectional area of the steel pipe or tube main body (hereinafter, referred to as "base pipe or tube part"). When a cross-sectional area of the shoulder surface is 15% or more, even if compression force is applied in the axial direction of the pipe or tube, the step C sufficiently serves as an abutment. When a cross-sectional area of the shoulder surface is 35% or less, the cross-sectional area of a seal part can be sufficiently secured, and thus, sealability is sufficiently exhibited. The cross-sectional area of the shoulder surface is more preferably 20% or more and 30% or less of the cross sectional area of the base pipe or tube part.

As used herein, integral joints having a step include a flush type and a semi-flush type. The "semi-flush type" means a joint in which internal threads are screwed to external threads, the internal threads being formed by causing a steel pipe or tube end on the internal thread side to protrude to the outer diameter side of the steel pipe or tube by expanding processing, and threading it, the external threads being formed by causing a steel pipe or tube end on the external thread side to protrude to the inner diameter side of the steel pipe or tube by swaging, and threading it. The "flush type" means a joint having no protrusion on the outer or inner diameter side unlike the semi-flush type, in which internal threads formed on one steel pipe or tube after swaging as needed are screwed with external threads formed on the other steel pipe or tube after swaging as needed. This disclosure is applicable to the flush type and the semi-flush type.

Next, characteristic parts of the threaded joint 1 in this embodiment are explained.

Conventionally, joint efficiency of the threaded joint 1 has been defined by the smaller one of a ratio of the cross-sectional area in the radial direction of a pin 2 in an end position 5 to the nominal cross-sectional area of the base pipe or tube part and a ratio of the cross-sectional area in the radial direction of a box 3 in an end position 7 to the nominal cross-sectional area of the base pipe or tube part. Based on the joint efficiency, tensile strength has been calculated. However, it has been found that in the threaded joint 1, when the strength in the end positions 4 and 6 is weak, tensile strength of the threaded joint is weaker than expectation, and thus the threaded joint 1 may be fractured in a position other than the end positions 5 and 7 (specifically, the end position 4 or 6). This is believed to be because of the following reasons. Specifically, all tensile loads are applied to a cross section in the radial direction in the end position 5 and a cross section in the radial direction in the end position 7. On the other hand, applied to a cross section in the radial direction in the end position 4 is only a tensile load corresponding to the length L1 in the axial direction of the steel pipe or tube in the first thread sequence A, and applied to a cross section in the radial direction in the end position 6 is only a tensile load corresponding to the length L2 in the axial direction of the steel pipe or tube in the second thread sequence B. Therefore, when cross sections in the radial direction in the end positions 4, 5, 6, and 7 are used for an index of tensile strength, an actual fractured surface cannot be correctly specified. Further, the inventors made further intensive studies and found that by using the following Formula (1) and Formula (2) as an index of tensile strength, even if a tensile load is applied to the threaded joint 1, the threaded joint 1 can be prevented from been fractured first in the end position 4 of the first thread sequence A and the end position 6 of the second thread sequence B. As the result, the inventors have found that excellent tensile strength can be obtained.

$$(P2, B2)_{min} \leq P1/\{L1/(L1+L2)\} \tag{1}$$

$$(P2, B2)_{min} \leq B1/\{L2/(L1+L2)\} \tag{2}$$

where (P2, B2) min represents P2 or B2, whichever is smaller, and in the case of P2=B2, any one of P2 and B2 may be used.

In the aforementioned Formula (1) and Formula (2), P1, P2, B1, B2, L1, and L2 follow the definitions below.

Referring to FIG. 1, the cross-sectional area in the radial direction of the pin 2 in the end position 4 on the proximal-end side of the pin of the first thread sequence A is defined as P1. The cross-sectional area in the radial direction of the pin 2 in the end position 5 on the proximal-end side of the pin of the second thread sequence B is defined as P2. The cross-sectional area in the radial direction of the box 3 in the end position 6 on the proximal-end side of the box of the second thread sequence B is defined as B1. The cross-sectional area in the radial direction of the box 3 in the end position 7 on the proximal-end side of the box of the first thread sequence A is defined as B2. The length in the axial direction of the steel pipe or tube of the first thread sequence A is defined as L1. The length in the axial direction of the steel pipe or tube of the second thread sequence B is defined as L2. The starting point of L1 (end position 7) is an intersection point of a straight line representing gradient of a chamfer part of the pin and a straight line connecting the crests of the threads of the pin in the first thread sequence A. The ending point of L1 (end position 4) is an intersection point of a straight line representing the gradient of a chamfer part of the box and a straight line connecting the crests of the threads of the box in the first thread sequence A. The starting point of L2 (end position 6) is an intersection point of a straight line representing the gradient of a chamfer part of the pin and a straight line connecting the crests of the threads of the pin in the second thread sequence B. The ending point of L2 (end position 5) is an intersection point of a straight line representing the gradient of a chamfer part of the box and a straight line connecting the crests of the threads of the box in the second thread sequence B.

The aforementioned Formula (1) and Formula (2) represent that a threaded joint is designed so that when a tensile load is applied to the threaded joint 1, stress applied to the threaded joint 1 becomes biggest either in the end position 5 of the second threaded joint B and in the end position 7 of the first threaded joint A. This can prevent the threaded joint 1 from being fractured first in the end position 4 of the first thread sequence A and the end position 6 of the second thread sequence B even when a tensile load is applied to the threaded joint 1. As the result, excellent tensile strength can be obtained.

The pin 2 can have a pin-nose part on the distal-end side of the pin, the pin-nose part being adjacent to the first thread sequence A and having no external thread. The box 3 can have a box-nose part on the distal-end side of the box, the box-nose part being adjacent to the second thread sequence B and having no internal thread. Further, when the threaded joint 1 is fastened, an outer circumferential surface of the pin-nose part and an inner circumferential surface of the box 3 facing the outer circumferential surface of the pin-nose part are in metal contact with each other in the radial direction of the steel pipe or tube, thus forming a seal part 8 on the distal-end side of the pin. This can prevent fluid inside of the steel pipe or tube from entering the region of the first thread sequence A. Further, an inner circumferential surface of the box-nose part and an outer circumferential surface of the pin 2 facing the inner circumferential surface of the box-nose part are in metal contact with each other in the radial direction of the steel pipe or tube, thus forming a seal part 9 on the distal-end side of the box. This can prevent fluid outside of the steel pipe or tube from entering the region of the second thread sequence B. Thus, the threaded joint 1 can have a structure (that is, "radial seal structure") in which the pin 2 and the box 3 are in metal contact with each other in the radial direction of the steel pipe or tube to thereby seal fluid. The length in the axial direction of the steel pipe or tube of the seal part 8 is not particularly limited, and may be, for example, 5 mm to 25 mm. The length in the axial direction of the steel pipe or tube of the seal part 9 is not particularly limited, and may be, for example, 5 mm to 25 mm.

The shape of the external threads and internal threads in this embodiment is not particularly limited, and may be, for example, a taper shape which is common to threaded joints. Further, a stabbing flank angle (angle which the front surface of a thread of the external threads forms to a line perpendicular to the axis of the steel pipe or tube) and a load flank angle (angle which the back surface of a thread of the external threads forms to a line perpendicular to the axis of the steel pipe or tube) are not particularly limited, either. For example, the stabbing flank angle can be 10° to 30°. The load flank angel can be −10° to 0°. With regard to the sign of the angles, in each of the front surface of a thread and the back surface of a thread, the angle is defined as positive when the crest of a thread is positioned on the side of the center between the front and back surfaces when viewed from the bottom part of the thread, and the angel is defined as negative when the crest of a thread is positioned on the opposite side.

Our threaded joint is explained above taking this embodiment as an example, but this disclosure is not limited to such and modifications can be made in the scope of Claims.

EXAMPLES

As examples and comparative examples, steel pipes or tubes of a steel type Q125 of API-5CT having an outer diameter and a thickness listed in Table 1 were prepared. Each steel pipe or tube was subjected to publicly-known cutting work to make a threaded joint having, as illustrated in FIG. 1, a length L1 in the axial direction of a steel pipe or tube of a first thread sequence A, a length L2 in the axial direction of a steel pipe or tube of a second thread sequence B, a cross-sectional area P1 in the radial direction of a pin 2 in an end position 4 on a proximal-end side of the pin of the first thread sequence A, a cross-sectional area P2 in the radial direction of the pin 2 in an end position 5 on a proximal-end side of the pin of the second thread sequence B, a cross-sectional area B1 in the radial direction of a box 3 in an end position 6 on a proximal-end side of the box of the second thread sequence B, a cross-sectional area B2 in the radial direction of the box 3 in an end position 7 on a proximal-end side of the box of the first thread sequence A, a contact height of a step C, a load flank angle, and a stabbing flank angle which have values listed in Table 1.

After the threaded joints obtained in the examples and the comparative examples were fastened with proper torque, each threaded joint was subjected to Limit Load Test prescribed in ISO13679:2002 under conditions of LP3 to thereby evaluate tensile strength. Table 1 lists the evaluation results.

TABLE 1

| Classification | Corresponding Figure | Outer diameter of a base pipe or tube (mm) | Thickness of a base pipe or tube (mm) | Cross-sectional area P1 in a position 4 (mm²) | Cross-sectional area P2 in a position 5 (mm²) | Cross-sectional area B1 in a position 6 (mm²) | Cross-sectional area B2 in a position 7 (mm²) | LengthL1 of a first thread series (mm) | LengthL2 of a second thread series (mm) | Formula (1) Left side | Formula (1) Right side | Satisfied or unsatisfied |
|---|---|---|---|---|---|---|---|---|---|---|---|---|
| Example 1 | FIG. 1 | 355.60 | 20.62 | 6729 (0.31) | 16277 (0.75) | 9987 (0.46) | 17361 (0.80) | 23.4 | 35.0 | 16277 (0.75) | 16793 (0.77) | Satisfied |
| Example 2 | FIG. 1 | 355.60 | 20.62 | 9014 (0.42) | 16277 (0.75) | 7558 (0.35) | 17361 (0.80) | 31.5 | 26.9 | 16277 (0.75) | 16740 (0.77) | Satisfied |
| Example 3 | FIG. 1 | 193.68 | 19.05 | 3599 (0.34) | 16277 (0.75) | 4309 (0.41) | 17361 (0.80) | 31.5 | 37.5 | 7676 (0.73) | 7884 (0.75) | Satisfied |
| Comparative Example 1 | — | 355.60 | 20.62 | 6948 (0.32) | 16277 (0.75) | 9768 (0.45) | 17361 (0.80) | 29.2 | 29.2 | 16277 (0.75) | 13896 (0.64) | Unsatisfied |
| Comparative Example 2 | — | 355.60 | 20.62 | 8940 (0.41) | 16277 (0.75) | 7637 (0.35) | 17361 (0.80) | 29.2 | 29.2 | 16277 (0.75) | 17880 (0.82) | Satisfied |
| Comparative Example 3 | — | 193.68 | 19.05 | 3553 (0.34) | 7676 (0.73) | 4254 (0.41) | 7996 (0.77) | 34.5 | 34.5 | 7676 (0.73) | 7106 (0.68) | Unsatisfied |

| Classification | Formula (2) Left side | Formula (2) Right side | Satisfied or unsatisfied | Contact height of an intermediate shoulder (mm) | Stabbing flank angle (°) | Load flank angle (°) | Fracture load (unit: kN) | Position of a fractured surface |
|---|---|---|---|---|---|---|---|---|
| Example 1 | 16277 (0.75) | 16644 (0.77) | Satisfied | 4.9 | 15 | −5 | 17421 | Position 5 |
| Example 2 | 16277 (0.75) | 16437 (0.76) | Satisfied | 4.9 | 15 | −5 | 17876 | Position 5 |
| Example 3 | 7676 (0.73) | 7929 (0.76) | Satisfied | 4.8 | 15 | −5 | 8025 | Position 5 |
| Comparative Example 1 | 16277 (0.75) | 19536 (0.90) | Satisfied | 4.9 | 15 | −5 | 15254 | Position 4 |
| Comparative Example 2 | 16277 (0.75) | 15274 (0.70) | Unsatisfied | 4.9 | 15 | −5 | 16260 | Position 6 |
| Comparative Example 3 | 7676 (0.73) | 8508 (0.81) | Satisfied | 4.8 | 15 | −5 | 7475 | Position 4 |

*The value in the blankets is a ratio to a cross-sectional area of a base pipe or tube

INDUSTRIAL APPLICABILITY

According to this disclosure, it is possible to obtain a threaded joint having excellent tensile strength. This disclosure is applicable to both the flush type and the semi-flush type, and in either type, excellent tensile strength can be obtained.

REFERENCE SIGNS LIST

1 threaded joint
2 pin
3 box
4 end position in a pin on the proximal-end side of the pin of a first thread sequence
5 end position in a pin on the proximal-end side of the pin of a second thread sequence
6 end position in a box on the proximal-end side of the box of a second thread sequence
7 end position in a box on the proximal-end side of the box of a first thread sequence
8 seal part on the distal-end side of a pin
9 seal part on the distal-end side of a box
A first thread sequence
B second thread sequence
C step
L1 length in the axial direction of a steel pipe or tube of a first thread sequence
L2 length in the axial direction of a steel pipe or tube of a second thread sequence

The invention claimed is:

1. A threaded joint comprising:
a pin having an externally threaded part comprising a first externally threaded section and a second externally threaded section across a step on an outer periphery on a distal-end side of a first steel pipe or tube; and
a box having an internally threaded part comprising a first internally threaded section and a second internally threaded section across the step on an inner periphery on a distal-end side of a second steel pipe or tube,
the externally threaded part being screwed to the internally threaded part to join the pin and the box, wherein
the first externally threaded section is provided on the distal-end side of the first steel pipe or tube with respect to the second externally threaded section,
the first internally threaded section is provided on the distal-end side of the second steel pipe or tube with respect to the second internally threaded section, and
assuming:
a region in which the first externally threaded section is screwed to the second internally threaded section is defined as a first thread sequence, and a region in which the second externally threaded section is screwed to the first internally threaded section is defined as a second thread sequence;

a length of the first thread sequence in the axial direction of the steel pipe or tube is defined as L1, and a length of the second thread sequence in the axial direction of the steel pipe or tube is defined as L2;

in the pin, a cross-sectional area in the radial direction at an end position on the opposite side to a distal end of the pin in the first thread sequence is defined as P1, and a cross-sectional area in the radial direction at an end position on the opposite side to a distal end of the pin in the second thread sequence is defined as P2; and in the box, a cross-sectional area in the radial direction at an end position on the opposite side to a distal end of the box in the second thread sequence is defined as B1, and a cross-sectional area in the radial direction at an end position on the opposite side to a distal end of the box in the first thread sequence is defined as B2, then L1, L2, P1, P2, B1, and B2 satisfy the following Formula (1) and Formula (2):

$$(P2, B2)_{min} \leq P1/\{L1/(L1+L2)\} \quad (1)$$

$$(P2, B2)_{min} \leq B1/\{L2/(L1+L2)\} \quad (2)$$

where $(P2, B2)_{min}$ represents P2 or B2, whichever is smaller.

2. The threaded joint according to claim 1, wherein the pin and the box have a radial seal structure in which the pin and the box are in metal contact with each other in the radial direction of the steel pipe or tube to thereby seal fluid.

3. The threaded joint according to claim 1, wherein the externally threaded part and the internally threaded part are tapered.

* * * * *